UNITED STATES PATENT OFFICE 2,058,852

QUICK HYDRATING ANHYDROUS DEXTROSE

Thomas A. Bruce, Western Springs, Ill., assignor to International Patents Development Company, Wilmington, Del., a corporation of Delaware No Drawing. Application December 23, 1935, Serial No. 55,833

9 Claims. (Cl. 99—141)

This invention relates, broadly speaking, to the production of a pure crystalline anhydrous dextrose which will have the property of hydrating very quickly when brought into contact with a sufficient amount of water; and more specifically is concerned with the manufacture of solid flavoring compounds composed of or comprising volatile aqueous solutions of flavoring extracts and anhydrous dextrose, which latter becomes hydrated in contact with the water of the flavoring extract solution so that a dry or substantially dry compound may be produced. In order to prevent the loss of flavoring substance by volatilization, it is desirable that the period of hydration be reduced as much as possible; and it is the primary object of this invention, considered specifically, to treat the anhydrous dextrose so that hydration of the dextrose to the desired extent will take place in a minimum time, thereby preventing the impairment of flavor resulting from the volatile character of the extract.

The invention is not limited, however, to this particular adaptation of the principles of the invention to practice. The intention is to cover the novel treatment of anyhdrous dextrose to give it this capacity for rapid hydration, together with all uses of the anhydrous dextrose when so treated.

The treatment in question, which may be effected in different ways, as will be described, results in covering the facets of the anhydrous crystals with very minute hydrate crystal nuclei which may be called sub-microscopic since their form and size can not be detected under a strong microscope, although their presence is detectable with the naked eye through the impaired lustre of the crystals. The facets of crystalline anhydrous dextrose, as the sugar comes from the centrifugal machines, have a brilliant lustre that is not sensibly affected by the usual drying process which takes place at relatively high temperatures. When, however, the anhydrous dextrose is treated in accordance with the present invention, this lustre is very much impaired. The facets are dull instead of being brilliant. The dulling effect is due to the formation on the facets of very minute hydrate crystal nuclei which are close together and cover substantially all of the facets of the crystals for substantially their entire area. When in this condition the anhydrous dextrose will become completely hydrated very rapidly in the presence of the requisite amount of water (for complete hydration one part of water to nine parts of the sugar, practically 5% of water is used when ordinary flavoring extracts are to be combined with annyarous dextrose, since larger quantities of water might affect the solubility of the solids in the extract solution; and with this amount of water, the sugar will of course be only partially hydrated). That is partial, or, if desired, substantially complete hydration will take place in from 1 to 8 minutes instead of requiring 30 to 60 minutes, or even longer in the case of anhydrous dextrose fresh from the process.

Apparently the mere quantity of the hydrate dextrose present is not of primary importance. The actual amount of anhydrous dextrose changed into the hydrate may be quite small. The important considerations are that there be a very large number of hydrate nuclei, that the nuclei be attached to, that is produced upon, the faces of the anhydrous dextrose crystals, and that this hydrate nucleation be distributed with substantial uniformity over all of the crystal facets. Merely mixing hydrate dextrose, even though finely ground, with the anhydrous dextrose will not produce the desired result.

The hydrate nucleation of the facets of the anhydrous crystals can be accomplished in several different ways:

(1) The anhydrous dextrose after having been dried in the usual manner may be stored in a moist atmosphere for from 30 to 60 days, the time varying according to the quantity of moisture in the atmosphere.

(2) The anhydrous dextrose as it comes from the centrifugal machines and containing, as it ordinarily will, from 1.5% to 2.5% of water, by weight, may be put into a mixing or drying apparatus and stirred for say 30 minutes. Some of the free moisture will evaporate, but enough will be taken up in the formation of hydrate crystal nuclei on the facets of the anhydrous crystals to give the effect desired.

(3) As a varient of method (2), the anhydrous dextrose as it comes from the centrifugal machines, which will ordinarily be at a temperature of about 150° Fahrenheit, may be run through the usual inclined cylindrical driers, but against a current of cool air, instead of hot air, and this cool air current will quickly reduce the temperature of the sugar to a point below the transition point between the anhydrous and hydrate phases, to wit, 122° Fahrenheit. Preferably, the air current is at a temperature so as to quickly reduce the sugar temperature to about 75°–80° Fahrenheit or lower; and in such case, the nucleating operation can be accomplished in 10 minutes or less.

(4) The anhydrous dextrose, after having been dried in the usual manner, is placed in a mixer and water added from 0.25% to 1.0% of the weight of the anhydrous dextrose. The material is agitated so as to thoroughly mix and distribute the water through the mass. This brings about the formation of minute hydrate dextrose crystals on the facets of the anhydrous dextrose, the operation requiring from 20 to 60 minutes.

In order to completely hydrate the anhydrous dextrose treated as above, and to accomplish this in a very short time, it is only necessary to mix the material with an adequate amount of water, which, of course, must be distributed and kept in distribution through the sugar by stirring or agitation. If only enough water is used to effect the hydration, the resultant product will be dry. The water may be contained in a solution, in which case the solids in the solution will be intimately compounded with the dextrose when hydration has taken place. This is the case in the manufacture of solid flavoring extracts.

It is the intention to cover all products and methods within the scope of the appended claims.

I claim:

1. Quick hydrating crystalline anhydrous dextrose, the crystals of which have their facets substantially covered with very minute hydrate crystal nuclei detectable through impairment of lustre of the facets.

2. Crystalline anhydrous dextrose, the crystals of which have their facets substantially covered with hydrate crystal nuclei of sub-microscopic size, but detectable through impaired lustre, whereby the anhydrous dextrose is capable of being hydrated in 1 to 8 minutes when mixed with water.

3. Method of giving anhydrous dextrose the capacity to hydrate completely in a short period of time in the presence of an adequate amount of water, which consists in subjecting the anhydrous dextrose to moisture at a temperature below 122° Fahrenheit to cover the facets of the crystals with very minute hydrate crystal nuclei detectable through impaired lustre of the crystals.

4. Method of giving anhydrous dextrose the capacity to hydrate completely in a short period of time in the presence of an adequate amount of water which consists in agitating a mass of the crystals before drying containing from 1.5% to 2.5% of free water until water from this source has been taken up by the dextrose in the form of minute hydrate crystal nuclei on the facets of the anhydrous crystals which are detectable through loss of lustre of the anhydrous crystals.

5. Method of giving anhydrous dextrose the capacity to hydrate completely in a short period of time in the presence of an adequate amount of water which consists in causing the anhydrous dextrose before drying containing from 1.5% to 2.5% of moisture and at a temperature of about 150° Fahrenheit to pass through a drier against a counter-current of air cooled to reduce the temperature of the sugar at delivery to 75°–80° Fahrenheit so as to produce minute hydrate crystal nuclei on the facets of the anhydrous crystals.

6. Method of giving anhydrous dextrose the capacity to hydrate completely in a short period of time in the presence of an adequate amount of water which consists in adding 0.25% to 1.0% of water, by weight of the anhydrous dextrose, to dried anhydrous dextrose and agitating the mixture so as to distribute the water.

7. Method of making a substantially dry compound of dextrose and a flavoring extract of a volatile character, which comprises mixing with anhydrous dextrose the facets of the crystals of which are covered with very minute hydrate crystal nuclei a solution of the extract containing enough water to hydrate the anhydrous dextrose.

8. Method of making a solid compound of dextrose and a flavoring extract which comprises subjecting anhydrous dextrose at a temperature below 122° Fahrenheit to moisture distributed throughout the mass and in sufficient quantity to cover the crystal facets with minute hydrate crystal nuclei, detectable by impairment of normal lustre; and then mixing with the dextrose thus nucleated a solution of the flavoring extract containing enough water to hydrate the anhydrous dextrose to the desired extent.

9. Method of making a solid compound of dextrose and a flavoring extract which consists in first subjecting anhydrous dextrose to moisture at a temperature favorable to the formation of hydrate dextrose, but in a quantity sufficient to produce only a slight hydration of the dextrose crystals; and thereafter mixing the anhydrous dextrose thus nucleated with a solution of flavoring extract containing about 5% of water to hydrate the anhydrous dextrose to this extent.

THOMAS A. BRUCE.